US012587893B2

(12) United States Patent
Arunachalam et al.

(10) Patent No.: US 12,587,893 B2
(45) Date of Patent: Mar. 24, 2026

(54) METHODS AND SYSTEMS FOR OPTIMIZING SIGNALING WITH TRAFFIC DETECTION FUNCTION

(71) Applicant: T-Mobile USA, Inc., Bellevue, WA (US)

(72) Inventors: Kameswaran Arunachalam, Redmond, WA (US); Rahul Pal, Bellevue, WA (US); Suresh Thanneeru, Redmond, WA (US); Swetha Gopisetti, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 110 days.

(21) Appl. No.: 18/737,829

(22) Filed: Jun. 7, 2024

(65) Prior Publication Data

US 2025/0380180 A1     Dec. 11, 2025

(51) Int. Cl.
*H04W 28/02* (2009.01)

(52) U.S. Cl.
CPC ... *H04W 28/0252* (2013.01); *H04W 28/0268* (2013.01)

(58) Field of Classification Search
None
See application file for complete search history.

(56) References Cited

U.S. PATENT DOCUMENTS

| | | | |
|---|---|---|---|
| 2019/0230693 A1* | 7/2019 | Li | H04W 72/1263 |
| 2019/0297634 A1* | 9/2019 | Dai | H04W 28/16 |
| 2019/0387446 A1* | 12/2019 | Xu | H04W 36/0061 |
| 2023/0308935 A1* | 9/2023 | Chen | H04W 28/0268 |
| 2023/0309166 A1* | 9/2023 | Qiao | H04W 76/12 |
| 2024/0195578 A1* | 6/2024 | Zhou | H04W 72/543 |

* cited by examiner

*Primary Examiner* — Quang N Nguyen
(74) *Attorney, Agent, or Firm* — Lee & Hayes, P.C.

(57) ABSTRACT

Methods and systems for optimizing signaling with traffic detection function are described herein. According to an implementation, a computing device, e.g., a session management function (SMF) in a wireless communication network, may receive, from a user plane function (UPF), a first message reporting detection of a first data flow from a user equipment. The computing device may configure a bearer to carry the first data flow based on a traffic flow template (TFT) and a quality of service (QOS) assigned by a policy control function (PCF). In some examples, the computing device may receive, from the UPF, a second message reporting detection of a second data flow from the user equipment. The computing device may update the TFT and use the QoS previously assigned to the bearer to carry the second data flow.

20 Claims, 5 Drawing Sheets

100 —

400

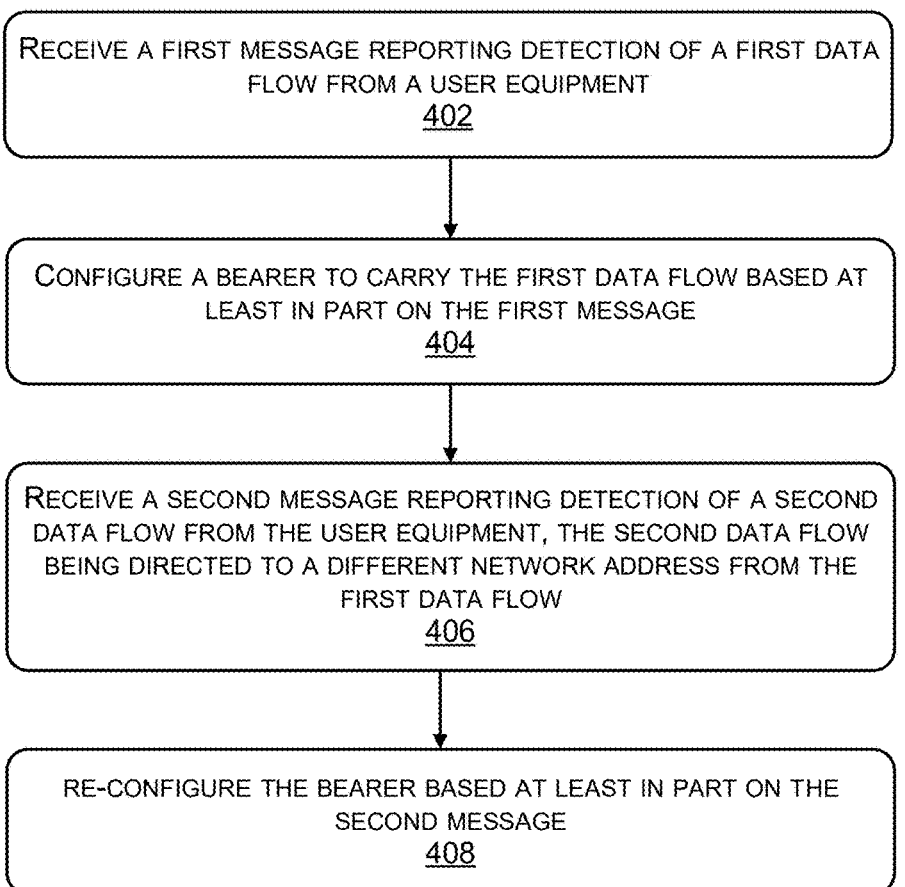

RECEIVE A FIRST MESSAGE REPORTING DETECTION OF A FIRST DATA FLOW FROM A USER EQUIPMENT
402

CONFIGURE A BEARER TO CARRY THE FIRST DATA FLOW BASED AT LEAST IN PART ON THE FIRST MESSAGE
404

RECEIVE A SECOND MESSAGE REPORTING DETECTION OF A SECOND DATA FLOW FROM THE USER EQUIPMENT, THE SECOND DATA FLOW BEING DIRECTED TO A DIFFERENT NETWORK ADDRESS FROM THE FIRST DATA FLOW
406

RE-CONFIGURE THE BEARER BASED AT LEAST IN PART ON THE SECOND MESSAGE
408

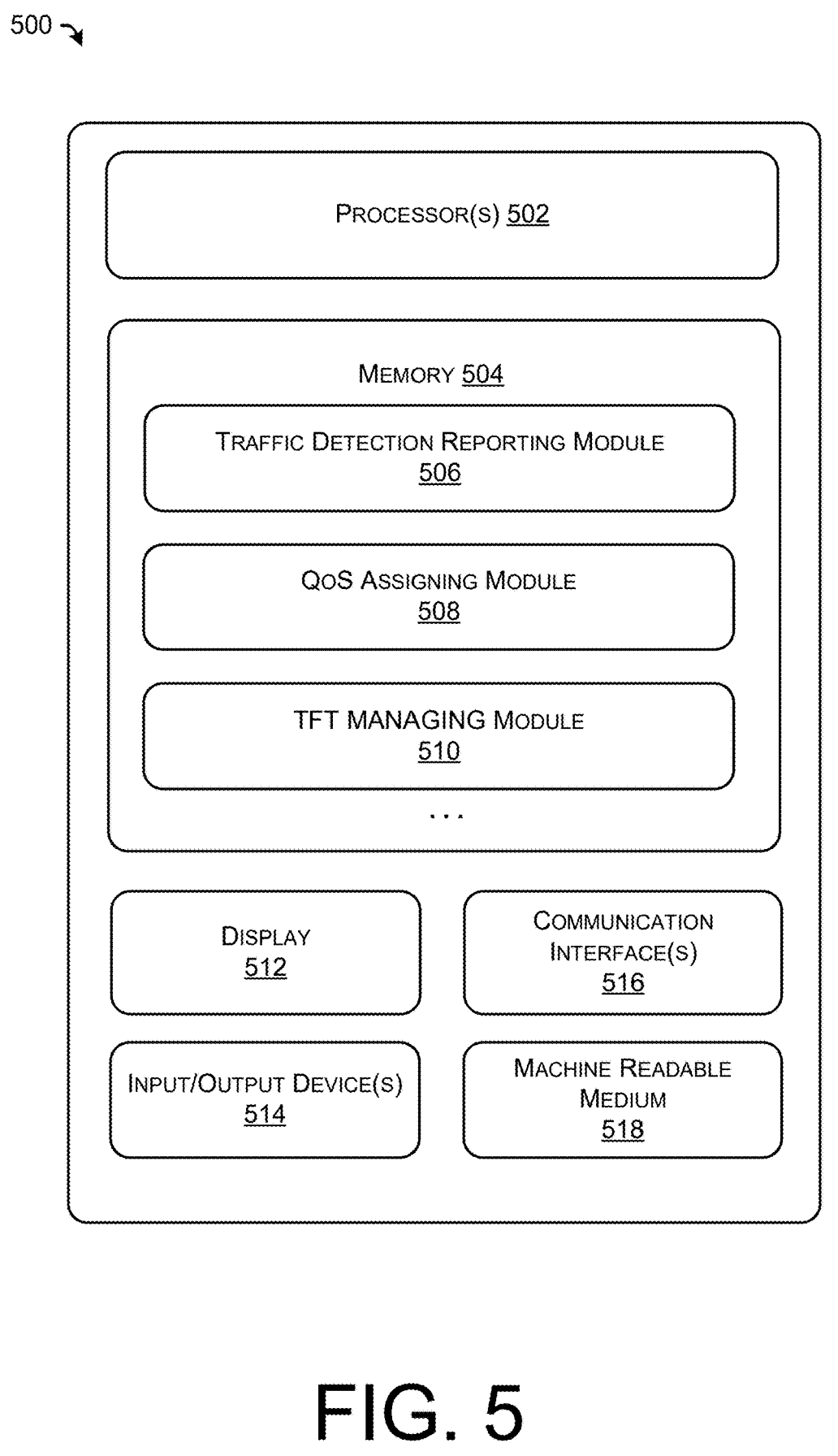

PROCESSOR(S) 502

MEMORY 504

TRAFFIC DETECTION REPORTING MODULE
506

QoS ASSIGNING MODULE
508

TFT MANAGING MODULE
510

. . .

DISPLAY
512

COMMUNICATION
INTERFACE(S)
516

INPUT/OUTPUT DEVICE(S)
514

MACHINE READABLE
MEDIUM
518

FIG. 5

METHODS AND SYSTEMS FOR OPTIMIZING SIGNALING WITH TRAFFIC DETECTION FUNCTION

BACKGROUND

In the fourth or fifth generation (4G/5G) wireless network, when a request from a user device to access the network is received, a traffic detection function (TDF) functionality support is enabled in Session Management Function (SMF)/User Plane Function (UPF) with pre-defined rules to detect specific application traffic such as online gaming. These pre-defined rules may be set based on IP or Application Detection and Control (ADC) based P2P protocol. Policy Control Function (PCF) is provisioned with the pre-defined rules and event triggers for a specific application (e.g., online gaming), which will be sent to the SMF as part of initial registration or public data network (PDN) activation procedure.

When the data traffic for a particular application (e.g., online gaming) is detected, the UPF informs the SMF, which triggers an APP_START message to be sent to the PCF. Upon receiving the APP_START message, the PCF sends Quality of Service (QOS) and traffic flow template (TFT) attributes to the SMF. The SMF may set up dedicated bearer based on TFT and QoS, and move all the application specific traffic to the dedicated bearer. Further, the UPF continues to monitor the traffic. Every time when a traffic with a different destination IP address is detected, the UPF informs the SMF, which triggers an N7 update request from the SMF to the PCF. In some circumstances, the subsequent traffic may be triggered by the same application, which leads no QoS parameter change. Therefore, when there is no QoS parameter change in the new traffic, the N7 update request from the SMF to the PCF increases the signaling burden on the N7 interface, leading to the PCF capacity impact.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 illustrates an example process for optimizing signaling with traffic detection function, according to an implementation of the present disclosure.

FIG. 5 illustrates an example computing device that implements techniques for optimizing signaling with traffic detection function, according to the present disclosure.

DETAILED DESCRIPTION

Figure 1:
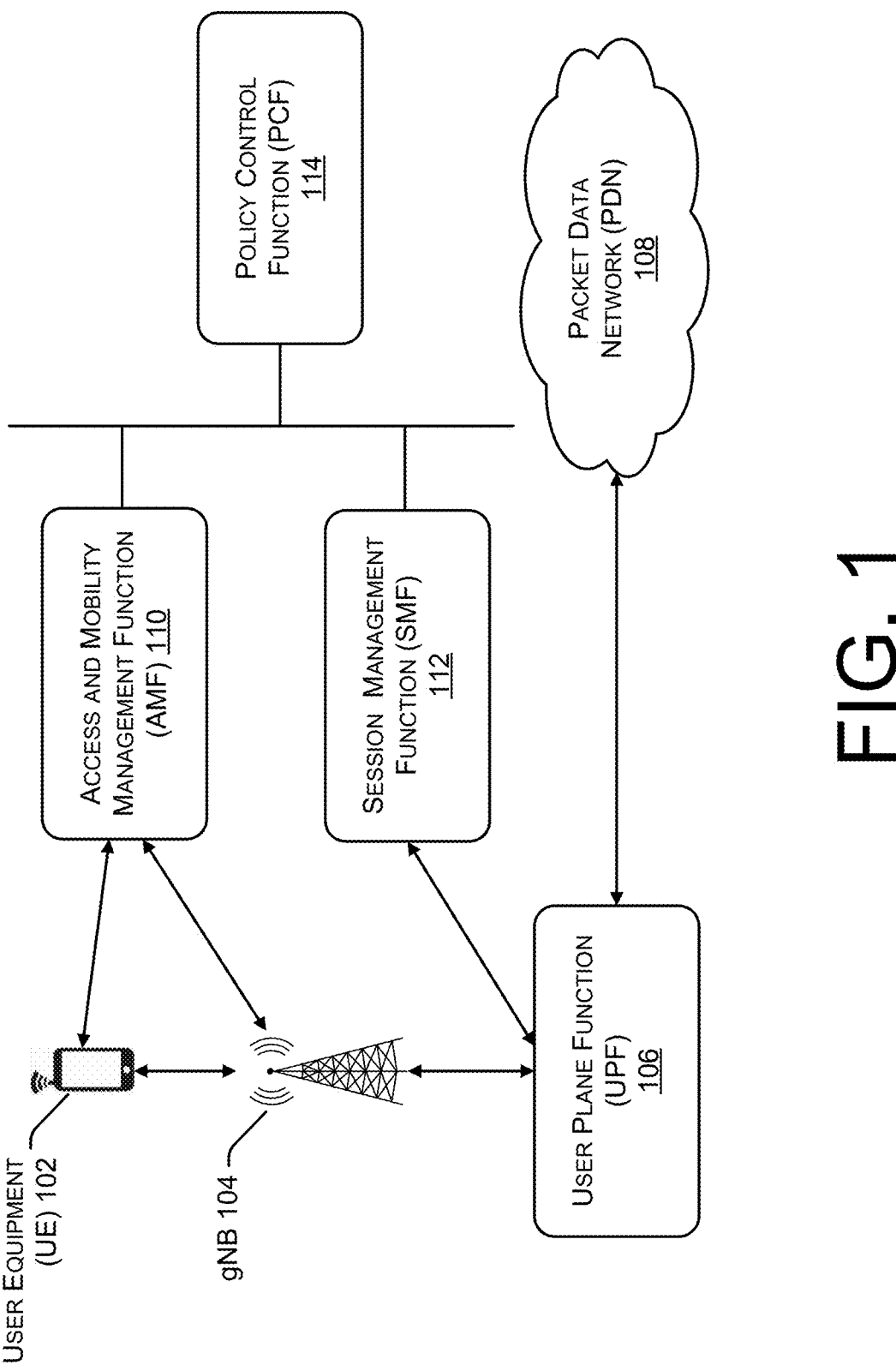
FIG. 1 illustrates an example network environment, in which techniques for optimizing signaling with traffic detection function are implemented, according to an implementation of the present disclosure.

Techniques for optimizing signaling with traffic detection function in a wireless communication network, such as the fifth generation (5G) wireless communication network, are disclosed herein.

According to an aspect of the present disclosure, a computing device, e.g., a session management function (SMF) of a core network, such as a 5G core network, may receive a first message reporting detection of a first data flow from a user equipment. The first data flow may be detected at a user plan function (UPF). The computing device may report the event (e.g., the detection of the first data flow) to a policy control function (PCF). In response, the PCF may return one or more parameters to the computing device to set up a dedicated bearer for the first data flow. The computing device may further receive a second message reporting detection of a second data flow from the user equipment. The second data flow may be directed to a different network address from the first data flow. The computing device may re-configure the bearer based at least in part on the second message.

In some examples, the one or more parameters to set up the dedicated bearer may include a traffic flow template (TFT) and quality of service (QOS) assigned for the first data flow. The computing device may accept the TFT and the QoS to configure the dedicated bearer.

In some examples, the computing device may re-configure the bearer by modifying the TFT based at least in part on the second message. The computing device may further use the QoS assigned for the first data flow to be assigned to the second data flow.

In some examples, the UPF may be configured with pre-defined application detection and control (ADC) rules. Upon receiving the first data flow, the UPF may determine that the first data flow is based on the pre-defined application detection and control (ADC) rules. The UPF may further determine that the second data flow is based on the pre-defined ADC rules.

In implementations, the first data flow and the second data flow may be triggered by a same application running on the user equipment.

As discussed herein, in the existing techniques for updating dedicated bearer, the SMF always sends N7 update request to the PCF even if the new IP flow is triggered by a same application running on the UE. The present disclosure suppresses the unnecessary signaling transmission on the N7 interface, thus, effectively reducing the burden on the N7 interface.

The techniques discussed herein may be implemented in a computer network using one or more of protocols including but are not limited to Ethernet, third generation (3G), fourth generation (4G), Long-Term Evolution (LTE), fifth generation (5G), sixth generation (6G), the further radio access technologies, or any combination thereof. In some examples, the network implementations may support standalone architectures, non-standalone architectures, dual connectivity, carrier aggregation, etc. Example implementations are provided below with reference to the following figures.

FIG. 1 illustrates an example network environment, in which techniques for optimizing signaling with traffic detection function are implemented, according to an implementation of the present disclosure.

The network scenario 100, as illustrated in FIG. 1, may be part of a telecommunication network of a wireless service provider such as, T-Mobile, AT&T, Sprint, Verizon Wireless, etc. The telecommunication network may include one or more core networks such as 4G evolved packet core (EPC) network, a 5G core network, etc. The network scenario 100 may include at least a packet data network (PDN) 108, an access point such as gNode B (gNB) 104, and one or more network function entities that enable a user equipment (UE) 102 to connect to PDN 108.

The access point may be located in a radio access network (RAN) compatible with various radio access technologies (RATs), such as 5G NR, 4G/LTE, HSDPA/HSPA+, UMTS, CDMA, GSM, WiMAX, Wi-Fi, and/or any other previous or future generation of radio access technology. For instance, gNB 104 may be compatible with 5G NR. Although not shown, the access point may also include eNodeB (eNB) compatible with 4G/LTE and other base stations such as 2G and 3G base stations that are compatible with GSM and CDMA RATs, respectively.

The PDN 108 may be a public data network established for providing data service for the public. Although not shown, the network scenario 100 may further include an IP multimedia system (IMS) that delivers voice (VOIP) and other multimedia services to the UEs over the PDN 108.

The one or more network functions/entities may be associated with the 4G EPC network, the 5G core network, and/or other networks. Some functionalities presented in the 4G EPC network elements are evolved and mapped against the 5G core network functions. By way of examples and without limitation, the one or more network functions/ entities, as shown in the network scenario 100 may include a user plane function (UPF) 106, an access and mobility management function (AMF) 110, a session management function (SMF) 112, a policy control function (PCF) 114, etc.

The UPF 106 may serve as the user data plane ingress and egress point to the 5G core network. When a subscriber establishes an evolved packet system (EPS) bearer to the PDN 108, the UPF 106 may serve as the point of attachment to the PDN 108 for the life of the EPS bearer. The UPF 106 may also perform packet inspection to ensure that the data is applied with an appropriate service level.

The AMF 110 may be configured to provide access and mobility session management for the 5G core network and support subscriber authentication, roaming and handovers to other networks.

The SMF 112 may be configured to manage the user sessions including establishment, modification and release of sessions. The SMF 112 may also allocate IP addresses for IP PDU sessions. The SMF 112 may communicate indirectly with the UE 102 through the AMF 110 that relays session-related messages between the devices and the SMFs.

The PCF 114 may be configured to determine the policy rules in the IMS network, support service data flow detection, policy enforcement and flow-based charging.

As discussed herein, frequency bands for the 5G NR may be separated into two different frequency ranges. Frequency Range 1 (FR1) includes frequency bands from 450 MHz to 6 GHZ, some of which overlaps the LTE frequency range. Frequency Range 2 (FR2) includes frequency bands from 24.25 GHz to 52.6 GHz. The 5G core network may provide a communication path between the UE 102 and the PDN 108. A protocol data unit (PDU) session may be established to provide the end-to-end user plane activity between the UE 102 and the PDN 108 through the UPF 106.

As part of the application detection and control (ADC) and/or traffic detection function (TFT) feature, currently, for any new IP flow detected on the UPF 106, a Packet Forwarding Control Protocol (PFCP) session report is sent from the UPF 106 to the SMF 112. The PFCP session report may indicate a start of traffic for an ADC pre-defined rule configured in the UPF 106. Upon receiving the PFCP session report, the SMF112 sends an N7 update request to the PCF 114 including an APP_START signal, an IP flow description, and an IP flow direction. In response to the N7 update request, the PCF 114 creates or updates a dedicated bearer associated with the IP flow but with the flow direction as bidirectional. However, in some circumstances, the subsequent IP flows are associated with the same application running on a user equipment. If there are no changes in quality of service (QOS) or the ADC pre-defined rule when a new IP flow is detected, the N7 update request from the SMF 112 unnecessarily increase the N7 signaling burden on the PCF 114.

According to the present disclosure, upon detecting a new IP flow (e.g., the ADC flow associated with the same application), the SMF 112 may update the dedicated bearer previously assigned to the flows generated from the same application without interacting with the PCF 114. The SMF 112 may reuse the QoS and charging rules associate with the existing dedicated bearer to support the session, thus, optimizing the N7 interface signaling.

It should be appreciated that the network scenario 100 is for the purpose of illustration. The core network may include one or more network functions in addition to those shown in FIG. 1. For example, the core network may also include an authentication server function (AUSF), a network slice selection function (NSSF), a unified data management function (UDM), a network repository function (NRF), a network exposure function (NEF), etc. The present disclosure is not intended to be limiting.

Figure 2:
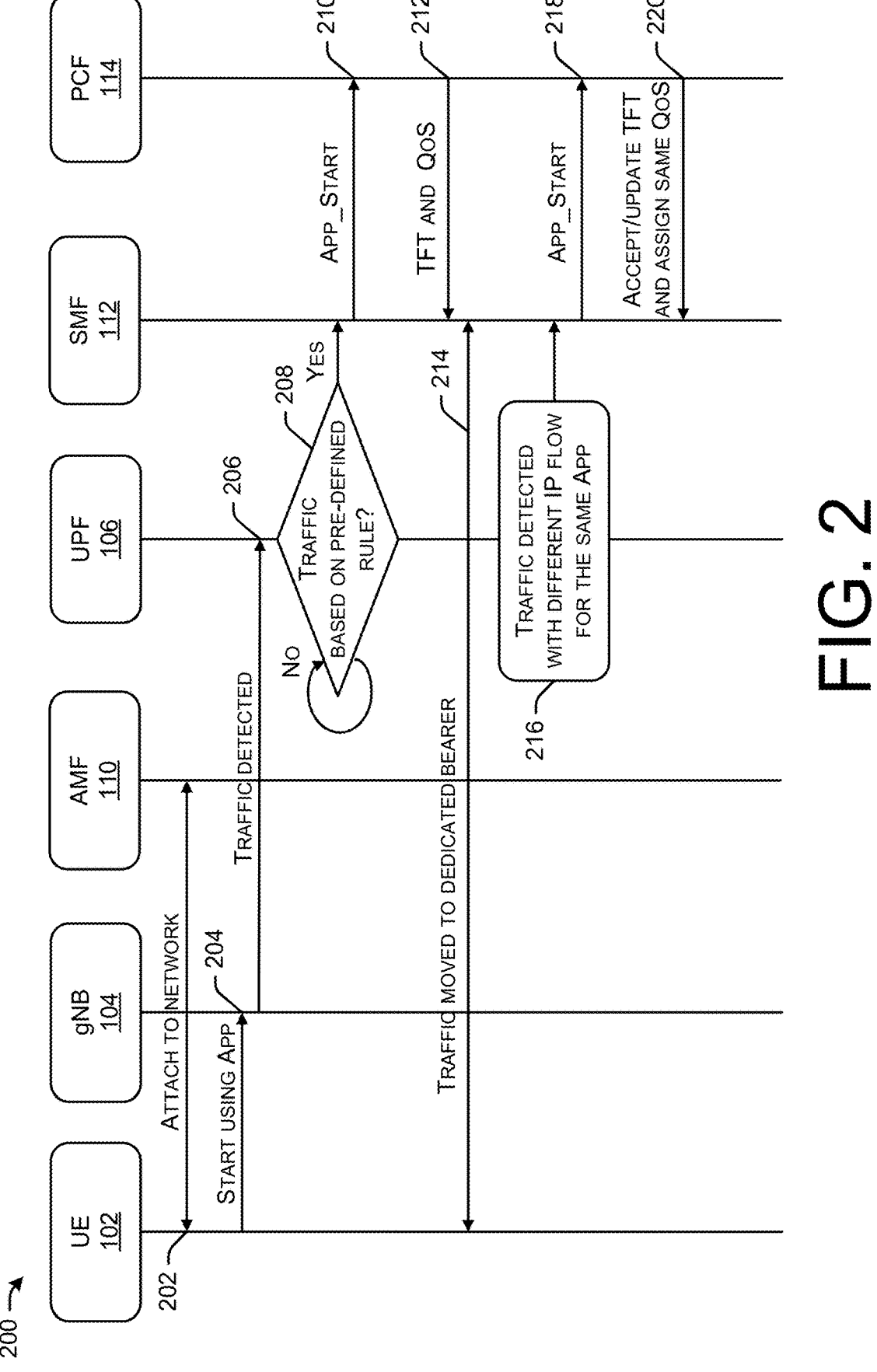
FIG. 2 illustrates an example scenario, in which techniques for updating a dedicated bearer upon detecting new IP flow are implemented, according to an implementation in the prior art.

FIG. 2 illustrates an example scenario, in which techniques for updating a dedicated bearer upon detecting new IP flow are implemented, according to an implementation in the prior art.

As shown in the example scenario 200, at 202, the UE 102 may attach to a network through gNB 104 and AMF 110. In implementations, when powering on, the UE 102 may start searching for nearby cells through a radio resource control (RRC) link. The UE 102 may acquire a frequency and timing synchronization with a searched cell and further send an attach request to the AMF 110 through gNB 104. In implementations, the attach request may be sent in a non-access stratum (NAS) message. The network capability of the UE 102 may be sent over the NAS message. By way of example and without limitation, the network capability of the UE 102 may include EPS encryption algorithm (EPA), EPS integrity algorithm (EIA), supported features such as CloT, ProSe (D2D), DCNR, V2X etc. Upon receiving the attach request from the UE 102, the AMF 110 may perform subscriber authentication management. The AMF 110 may query a unified data management (UDF) for authentication information associated with the subscriber. The UDM may return the authentication information to the AMF 110. The AMF 110 further requests the authentication information from the UE 102. If the authentication information provided by the UE 102 matches the authentication information provided by the UDM, the AMF 110 may determine that the subscriber is authenticated.

During the initial attachment, the UPF 106 may be configured with pre-defined rules for traffic detection. In some examples, the pre-defined rules may be set for various application detection control. The PCF 114 may also be provisioned with the pre-defined rules and event triggers for APP_START and APP_STOP detections.

Once the UE 102 is attached to the network, at 204, the subscriber or the user may start using an application on the device such as browsing a website, launching an online gaming app, using an online exercise app, etc. At 206, the data traffic generated by using the application may be detected by the UPF 106. The traffic detection function (TDF) implemented by the UPF 106 may determine whether the data traffic is based on the pre-set rules at 208. If the data traffic is not based on the pre-set rules, the UPF 106 continues monitoring subsequent data traffic. If the data traffic is based on the pre-set rules, the UPF 106 may forward a Packet Forwarding Control Protocol (PFCP) session report to the SMF 112. Upon receiving the PFCP session report, the SMF 112 may send an APP_START signal to the PCF 114 at 210. In response, at 212, the PCF 114 may send a traffic flow template (TFT) to the SMF 112 to set up a dedicated bearer to carry the data traffic from the UE 102. In addition, the PCF 114 may assign a QoS parameter to set up the dedicated bearer and send the QoS parameter along with the TFT to the SMF 112. Upon receiving the QoS parameter and the TFT, the SMF 112 may perform dedicated bearer setup and move the detected data traffic to the dedicated bearer at 214.

In implementations, the UPF 106 may continuously monitor the data traffic in the network. The UPF 106 may detect data traffic with different IP flow for the same application at 216. For example, the IP flow may be generated by the same application but with a different destination IP address. Upon detecting the new IP flow, the SMF 112 may send again an APP_START signal to the PCF 114 at 218. The PCF 114 may accept and/or update the TFT and re-assign the same QoS for the data traffic at 220.

As discussed herein, every time when there is an IP flow change (e.g., destination IP address change), the UPF 106 may send the PFCP session report to the SMF 112. The SMF 112 may interact with the PCF 114 again, causing the PCF 114 to update the parameters of the bearer. The interaction between the SMF 112 and the PCF 114 may cause additional data transmission on the N7 interface. To address this, the present disclosure suppresses the interaction between the SMF 112 and the PCF 114 when the data flow associated with the same application is detected at the UPF 106.

Figure 3:
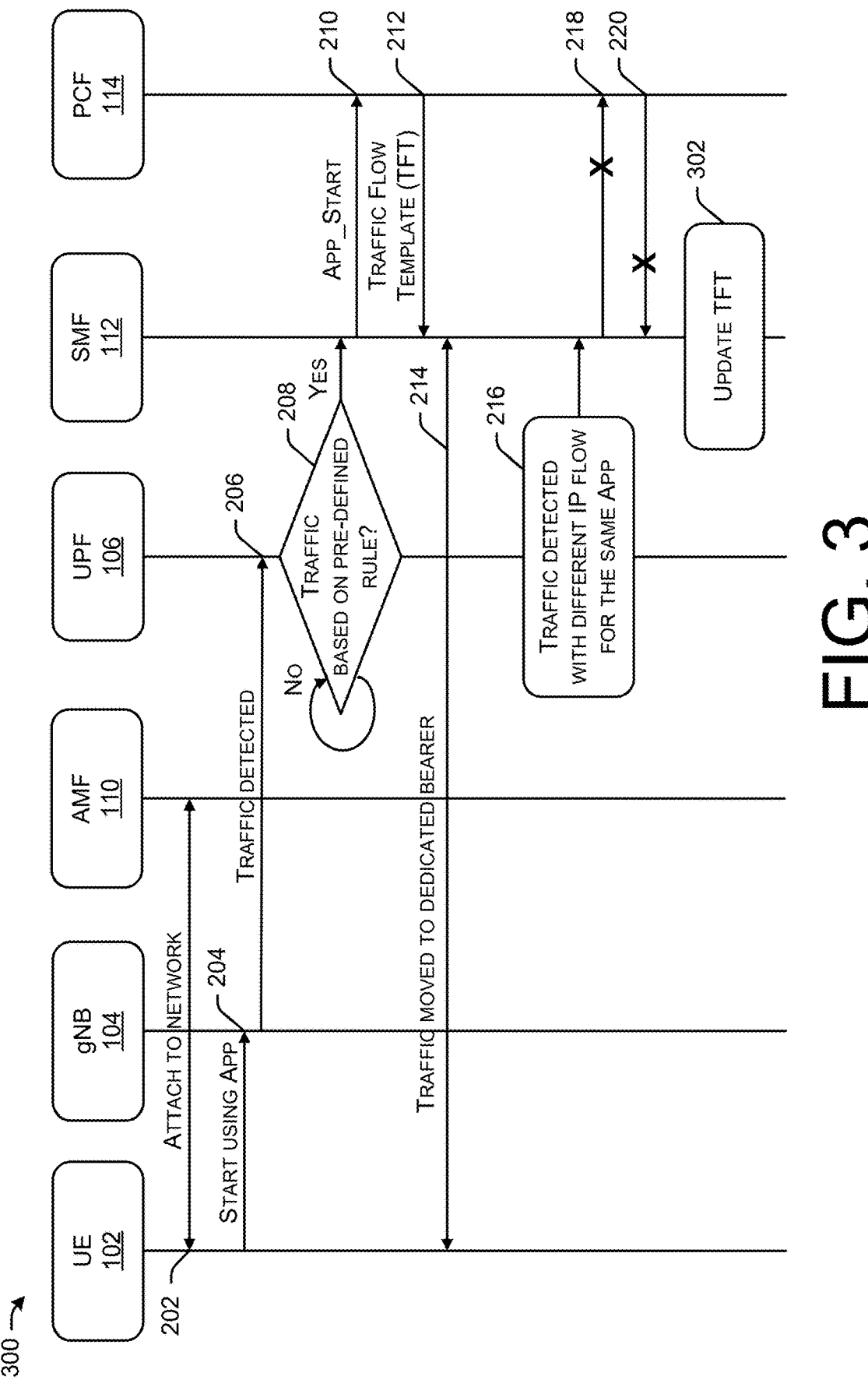
FIG. 3 illustrates an example scenario, in which techniques for updating a dedicated bearer upon detecting new IP flow are implemented, according to an implementation of the present disclosure.

FIG. 3 illustrates an example scenario, in which techniques for updating a dedicated bearer upon detecting new IP flow are implemented, according to an implementation of the present disclosure. As shown in the example scenario 300, the interactions 218 and 220 between the SMF 112 and the PCF 114 may be suppressed. When the SMF 112 receives a PFCP session report from the UPF 106 regarding a new IP flow being detected from the same application, the SMF 112 may accept and/or update the traffic flow template associated with the dedicated bearer and re-use the existing dedicated bearer's QoS and charging rules at 302. In this way, signaling traffic on the N7 interface can be optimized to reduce unnecessary signaling transmission.

FIG. 4 illustrates an example process for optimizing signaling with traffic detection function, according to an implementation of the present disclosure. The example process 400 may be implemented on a session management function (e.g., the SMF 112 as illustrated in FIG. 1, FIG. 2, and FIG. 3) in a 5G core network.

At operation 402, the process may include receiving a first message reporting detection of a first data flow from a user equipment. As discussed herein, the user equipment (e.g., the UE 102 in FIG. 1) may first attach to the network when powering on and/or roaming to a different serving area. The data flow may indicate one or more types of services requested by the user. For instance, the data flow may include data packets generated by an online gaming application, a browser application, an online video application, etc. The UPF (e.g., the UPF 106 in FIG. 1) may be configured with pre-defined rules for data traffic detection. In implementations, each data packet may indicate a destination network address, e.g., IPv4 address of the application server, IPv6 address of the application server, etc. In implementations, the UPF may use the application detection and control (ADC) to establish a dynamic QoS flow when a data traffic is detected.

At operation 404, the process may include configuring a bearer to carry the first data flow based at least in part on the first message. In some examples, when a data traffic is detected, the UPF may report to the SMF, which then reports to the PCF (e.g., the PCF 114 of FIG. 1). The PCF may then make policy decisions based on the reported information (e.g., the first message). For instance, the PCF may send the parameters to set up the bearer for the data flow. In some examples, the parameters to se tup the bearer may include a traffic flow template (TFT) and a quality of service (QOS). The SMF may configure the bearer to carry the data traffic based at least in part on the parameters assigned by the PCF. For instance, a bearer may be configured for the data flow triggered by an online gaming application. In another instance, a bearer may be configured for the data flow triggered by a browsing application, which has a different QoS requirement from the online gaming application.

At operation 406, the process may include receiving a second message reporting detection of a second data flow from the user equipment, the second data flow being directed to a different network address from the first data flow. In some examples, the UPF may detect new data flow triggered by the same application running on the user equipment. The new data flow may indicate a different destination network address. For instance, a player may join the online gaming application from a different IP address, triggering a new data flow. In another instance, the user may visit a different website using the same browsing application running the UE.

At operation 408, the process may include re-configuring the bearer based at least in part on the second message. As discussed herein, upon detecting a new data traffic, the UPF always reports to the SMF regarding the newly detected data traffic. In existing techniques, upon receiving the report from the UPF, the SMF sends APP_START message to the PCF, regardless of whether the newly detected data traffic is from the same application. The present disclosure suppresses the transmission of the APP_START message or APP_STOP message from the SMF to the PCF. Instead, the SMF may re-configure the bearer and update the parameters associated with the bearer dedicated to the previously detected data traffic from the same application. In implementations, instead of reporting the newly detected data traffic to the PCF, causing the PCF to accept or modify the traffic flow template (TFT) and re-assign the same QoS, the SMF may accept and/or update the traffic flow template (TFT) and use the existing QoS configured for the bearer. Therefore, the newly detected data traffic does not trigger a signaling transmission on the N7 interface between the SMF and the PCT, reducing the burden of signaling on the N7 interface.

FIG. 5 illustrates an example computing device that implements techniques for optimizing signaling with traffic detection function, according to the present disclosure. The example computer device 500 may implemented by a session management function (e.g., the SMF 112 as illustrated in FIG. 1, FIG. 2, and FIG. 3) in a 5G core network.

In various examples, the processor(s) 502 can be a central processing unit (CPU), a graphics processing unit (GPU), or both CPU and GPU, or any other type of processing unit. Each of the one or more processor(s) 502 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 502 may also be responsible for executing all computer applications stored in memory 504, which can be associated with common types of volatile (RAM) and/or nonvolatile (ROM) memory.

As illustrated in FIG. 5, the computing device 500 may comprise processor(s) 502, a memory 504 storing a traffic detection reporting module 506, a QoS assigning module 508, a TFT managing module 510, a display 512, input/output device(s) 514, communication interface(s) 516, and/or a machine readable medium 518.

In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 500. Any such non-transitory computer-readable media may be part of the computing device 500.

The traffic detection reporting module 506 may be configured to report the data traffic detected by the user plane function (e.g., the UPF 106 in FIG. 1). In some examples, upon detecting a data traffic from a user equipment (e.g., the UE 102 in FIG. 1), the UPF may send a Packet Forwarding Control Protocol (PFCP) session report to the computing device 500. The traffic detection reporting module 506 may then generate a message such as APP_START or APP_STOP to the policy control function (e.g., the PCF 114 in FIG. 1). In some examples, to reduce the signaling transmission on the N7 interface, when the detected data traffic is triggered by a same application on the user equipment, the traffic detection reporting module 506 may not report the detected data traffic to the PCF.

The QoS assigning module 508 may be configured to assign the QoS to be associated with the bearer to carry a detected data flow. When a new data flow is triggered from an application running on the user equipment, the PCF may assign the QoS to set up the bearer based on the service requested by the user equipment. The QoS assigning module 508 may then assign the QoS to be associated with the bearer to carry the data flow. In some examples, subsequent data flow detected at the UPF may be triggered by the same application but directed to a different network address. The QoS assigning module 508 may use the existing QoS pre-assigned to the bearer to carry the subsequent data flow, rather than reporting to the PCF to re-assign the QoS.

The TFT managing module 510 may be configured to accept and/or update a traffic flow template (TFT) for detected data flow. When a new data flow is triggered from an application running on the user equipment, the PCF may the TFT to the TFT managing module 510 to be associated with the bearer to carry the new data flow. When subsequent data flow triggered by the same application but directed to a different network address is detected, the TFT managing module 510 may update the TFT such as adding the packet filters to the existing TFT, replacing the packet filters in the existing TFT, deleting the packet filters in the existing TFT, etc.

The communication interface(s) 516 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the communication interface(s) 516 can be compatible with multiple radio access technologies, such as 5G radio access technologies and 4G/LTE radio access technologies. Accordingly, the communication interfaces 516 can allow the computing device 500 to connect to the 5G system described herein.

Display 512 can be a liquid crystal display or any other type of display commonly used in the computing device 500. For example, display 512 may be a touch-sensitive display screen and can then also act as an input device or keypad, such as for providing a soft-key keyboard, navigation buttons, or any other type of input. Input/output device(s) 514 can include any sort of output devices known in the art, such as display 512, speakers, a vibrating mechanism, and/or a tactile feedback mechanism. Input/output device(s) 514 can also include ports for one or more peripheral devices, such as headphones, peripheral speakers, and/or a peripheral display. Input/output device(s) 514 can include any sort of input devices known in the art. For example, input/output device(s) 514 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 518 can store one or more sets of instructions, such as software or firmware, which embodies any one or more of the methodologies or functions described herein. The instructions can also reside, completely or at least partially, within the memory 504, processor(s) 502, and/or communication interface(s) 516 during execution thereof by the computing device 500. The memory 504 and the processor(s) 502 also can constitute machine readable media 518.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, are not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example examples.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A computing device, comprising:

a processor;

a non-transitory computer-readable memory storing computer-executable instructions that, when executed by the processor, cause the processor to perform actions including:

receiving, from a user plane function (UPF), a first message reporting detection of a first data flow from a user equipment;

configuring a bearer to carry the first data flow based at least in part on the first message, including: creating a traffic flow template (TFT) to be associated with the bearer to carry the first data flow, and assigning quality of service (QOS) to be associated with the bearer to carry the first data flow;

receiving, from the UPF, a second message reporting detection of a second data flow from the user equipment, the second data flow being directed to a different network address from the first data flow; and re-configuring the bearer based at least in part on the second message.

2. The computing device of claim 1, wherein the computer-executable instructions, when executed by the processor, cause the processor to perform actions further including:

upon receiving the first message, sending, to policy control function (PCF), a signal reporting the detection of the first data flow;

receiving, from the PCF, at least one parameter to configure the bearer; and configuring, based on the at least one parameter, the bearer for the first data flow.

3. The computing device of claim 2, wherein the at least one parameter includes the quality of service (QOS).

4. The computing device of claim 2, wherein the at least one parameter further includes a traffic flow template, and configuring a bearer to carry the first data flow based at least in part on the first message further includes:

accepting the traffic flow template to be associated with the bearer to carry the first data flow.

5. The computing device of claim 4, wherein re-configuring the bearer based at least in part on the second message further includes:

modifying the traffic flow template based at least in part on the second message.

6. The computing device of claim 3, wherein re-configuring the bearer based at least in part on the second message further includes:

using the QoS to be associated with the bearer to carry the second data flow.

7. The computing device of claim 1, wherein the computer-executable instructions, when executed by the processor, cause the processor to perform actions further including:

determining that the first data flow is based on a predefined application detection and control (ADC) rule.

8. The computing device of claim 7, wherein the computer-executable instructions, when executed by the processor, cause the processor to perform actions further including:

determining that the second data flow is based on the pre-defined ADC rule.

9. The computing device of claim 1, wherein the first data flow and the second data flow are triggered by an application running on the user equipment.

10. A computer-implemented method, comprising:

receiving, from a user plane function (UPF), a first message reporting detection of a first data flow from a user equipment;

configuring a bearer to carry the first data flow based at least in part on the first message, including: creating a traffic flow template (TFT) to be associated with the bearer to carry the first data flow, and assigning quality of service (QOS) to be associated with the bearer to carry the first data flow;

receiving, from the UPF, a second message reporting detection of a second data flow from the user equipment, the second data flow being directed to a different network address from the first data flow; and re-configuring the bearer based at least in part on the second message.

11. The computer-implemented method of claim 10, further comprising:

upon receiving the first message, sending, to policy control function (PCF), a signal reporting the detection of the first data flow;

receiving, from the PCF, at least one parameter to configure the bearer; and configuring, based on the at least one parameter, the bearer for the first data flow.

12. The computer-implemented method of claim 11, wherein the at least one parameter includes the quality of service (QOS).

13. The computer-implemented method of claim 11, wherein the at least one parameter further includes a traffic flow template, and configuring a bearer to carry the first data flow based at least in part on the first message further includes:

accepting the traffic flow template to be associated with the bearer to carry the first data flow.

14. The computer-implemented method of claim 13, wherein re-configuring the bearer based at least in part on the second message further includes:

modifying the traffic flow template based at least in part on the second message.

15. The computer-implemented method of claim 12, wherein re-configuring the bearer based at least in part on the second message further includes:

using the QoS to be associated with the bearer to carry the second data flow.

16. The computer-implemented method of claim 10, further comprising:

determining that the first data flow is based on a pre-defined application detection and control (ADC) rule.

17. The computer-implemented method of claim 16, further comprising:

determining that the second data flow is based on the pre-defined ADC rule.

18. The computer-implemented method of claim 10, wherein the first data flow and the second data flow are triggered by an application running on the user equipment.

19. A non-transitory computer-readable storage medium storing computer-readable instructions, that when executed by a processor, cause the processor to perform operations comprising:

receiving, from a user plane function (UPF), a first message reporting detection of a first data flow from a user equipment;

configuring a bearer to carry the first data flow based at least in part on the first message, including: creating a traffic flow template (TFT) to be associated with the bearer to carry the first data flow, and assigning quality of service (QOS) to be associated with the bearer to carry the first data flow;

receiving, from the UPF, a second message reporting detection of a second data flow from the user equipment, the second data flow being directed to a different network address from the first data flow; and re-configuring the bearer based at least in part on the second message.

20. The non-transitory computer-readable storage medium of claim 19, wherein re-configuring the bearer based at least in part on the second message further comprises:

modifying the TFT to be associated with the bearer to carry the second data flow; and using the QoS to be associated with the bearer to carry the second data flow.

* * * * *